US008595929B2

(12) United States Patent
Manjooran et al.

(10) Patent No.: US 8,595,929 B2
(45) Date of Patent: Dec. 3, 2013

(54) REPAIR OF A TURBINE ENGINE SURFACE CONTAINING CREVICES

(75) Inventors: Navin J. Manjooran, Plainsville, NJ (US); Zafir A. M. Abdo, Orlando, FL (US); Anita Marie Hunt, Orlando, FL (US); Anand A. Kulkarni, Oviedo, FL (US); Diego L. Caso, Jr., Winter Garden, FL (US)

(73) Assignee: Siemens Energy, Inc., Orlando, FL (US)

( * ) Notice: Subject to any disclaimer, the term of this patent is extended or adjusted under 35 U.S.C. 154(b) by 372 days.

(21) Appl. No.: 12/909,183

(22) Filed: Oct. 21, 2010

(65) Prior Publication Data

US 2012/0096713 A1 Apr. 26, 2012

(51) Int. Cl.
*B23P 6/00* (2006.01)

(52) U.S. Cl.
USPC .................. 29/889.1; 427/560; 427/600

(58) Field of Classification Search
USPC .............. 29/889.1, 402.01, 402.04, 402.09, 29/402.18; 427/560, 600
See application file for complete search history.

(56) References Cited

U.S. PATENT DOCUMENTS

| 5,607,718 | A | * | 3/1997 | Sasaki et al. | 438/584 |
|---|---|---|---|---|---|
| 5,662,769 | A | | 9/1997 | Schonauer et al. | |
| 6,465,403 | B1 | * | 10/2002 | Skee | 510/175 |
| 6,530,971 | B1 | * | 3/2003 | Cohen et al. | 75/254 |
| 6,736,905 | B2 | * | 5/2004 | Smith et al. | 134/8 |
| 7,017,793 | B2 | * | 3/2006 | Kinstler | 228/119 |
| 7,303,112 | B2 | | 12/2007 | Ivory et al. | |
| 7,307,055 | B2 | * | 12/2007 | Cook et al. | 510/438 |
| 7,332,463 | B2 | * | 2/2008 | Greenberg | 510/240 |
| 7,611,588 | B2 | * | 11/2009 | Peitersen et al. | 134/26 |
| 2001/0008877 | A1 | * | 7/2001 | Hartmann et al. | 510/171 |
| 2002/0028639 | A1 | * | 3/2002 | Darcangelo et al. | 451/41 |
| 2002/0100492 | A1 | * | 8/2002 | Risbeck et al. | 134/1 |
| 2003/0102011 | A1 | * | 6/2003 | Smith et al. | 134/8 |
| 2004/0121182 | A1 | * | 6/2004 | Hardwicke et al. | 428/680 |
| 2004/0167053 | A1 | * | 8/2004 | Knopeck et al. | 510/405 |
| 2005/0067466 | A1 | * | 3/2005 | Boegli et al. | 228/119 |

(Continued)

FOREIGN PATENT DOCUMENTS

DE 10026864 A1 * 12/2001 ............... C23G 1/00
WO WO 2006106045 A1 * 10/2006

OTHER PUBLICATIONS

F. Vereda, J. de Vicente, R. Hidalgo-Alvarez, Colloidal characterization of micron-sized rod-like magnetite particles. Colloids and Surfaces A: Physicochem. Eng. Aspects 319 (2008) 122-129.*

(Continued)

*Primary Examiner* — Jermie Cozart
*Assistant Examiner* — Ruth G Hidalgo-Hernandez

(57) ABSTRACT

A composition and method for cleaning turbine engine components (10) during servicing. An embodiment of the invention includes a colloidal mixture or slurry (22) of nanoparticles. The slurry may be nontoxic and provide optimal cleaning of tiny surface-exposed crevices (18) of braze joints and components. When a colloidal mixture is in a polar solvent, the pH of the slurry is maintained at about 5 to 9 and at the isoelectric point of the nanoparticles to minimize or prevent agglomeration. When a colloidal mixture is in a nonpolar solvent, the pH of the slurry is maintained at about 5 to 9 and at the isoelectric point of the nanoparticles to minimize or prevent agglomeration by use of surfactant additives.

9 Claims, 3 Drawing Sheets

(56) References Cited

U.S. PATENT DOCUMENTS

2006/0137724 A1* 6/2006 Powers et al. .................. 134/41
2006/0207635 A1* 9/2006 Bian .............................. 134/42
2007/0087950 A1* 4/2007 Korolik et al. ................ 510/175
2009/0101625 A1* 4/2009 Bakshi et al. .................. 216/38

OTHER PUBLICATIONS

Aircraft & Aerospace Cleaning Products. Zaviation. http:/www.zaviation.ca/products/z.i.chemicals/z.i.chemicals.htm, Apr. 13, 2010.
All In-1: Colloid Power; What is a Colloid Cleaner? Shellharbour NSW, Danap Pty. Ltd. http:/www.colloidcleaner.com/COLLOID%20POWER.htm, Apr. 8, 2010.
ECO 2000. What are Colloidal Cleaners? http:/www.eco2000.com.au/Industrial/colloidal.shtml, Sep. 1, 2010.
ECO 2000. Zi-400 Aircraft Colloidal Cleaner. http://www.eco2000.com.au/Industrial/zi400air/shtml Apr. 13, 2010.
Naturesolve AC Aircraft Cleaning Solution. UKSpill Association. http://www.rossenvironmentalproductsltd.co.uk/naturesolve.htm, Sep. 1, 2010.
Ross Environmental Materials Safety Data Sheet. UKSpill Association. http://www.rossenvironmentalproductsltd.co.uk/msds-eliminator.htm, Sep. 1, 2010.
Silver Colloids: Scientific Information on Colloidal Silver. The Influence of Zeta Potential. http://www.silver-colloids.com/Tutorials/Intro/pcs18.html, Apr. 23, 2010.
Solution 2000(R) colloidal cleaner, colloidal degreaser. http://www.envirosna.com/ Apr. 13, 2010.
Zeta Potential (from Wikipedia, the free encyclopedia) http://en.wikipedia.org/wiki/Zeta_potential, Apr. 23, 2010.
Sun, et al.; "Influence of the Initial pH on the Adsorption Behaviour of Dispersant on Nano Zirconia Powder"; Journal of the European Ceramic Society, vol. 19, No. 9, Jul. 1, 1999; pp. 1725-1730.

* cited by examiner

REPAIR OF A TURBINE ENGINE SURFACE CONTAINING CREVICES

FIELD OF THE INVENTION

The invention generally relates to turbine engine servicing, and more particularly to a composition and method of cleaning and repairing turbine engine components having surfaces containing small cracks or crevices.

BACKGROUND AND SUMMARY OF THE INVENTION

Gas turbine engine components may be formed of superalloy material known for high temperature performance in terms of tensile strength, creep resistance, oxidation resistance, and corrosion resistance. The superalloy component may be a nickel-base alloy, wherein nickel is the single greatest element in the superalloy by weight. Illustrative nickel-base superalloys include at least about 40 wt % Ni, and at least one component from the group including cobalt, chromium, aluminum, tungsten, molybdenum, titanium, and iron.

Various turbine engine components crack, erode or experience conditions necessitating a repair. No joining process (braze, bond, weld, etc) will have a good result with contaminants/oxides present; e.g. brazes won't adhere, welds will have defects etc. In situations where the contaminant or oxide cannot be removed by a simple mechanical means due to its location in a crevice or crack, special cleaning techniques are required. Note that the term contaminant may be used herein to include both oxides and non-oxides, although oxide contaminants are commonly found in gas turbine applications.

Prior to servicing a turbine component, it is necessary that contaminants/oxides be removed so that a subsequent braze, for example, will adhere to the base material. A fluoride ion cleaning (FIC) procedure currently known in the industry utilizes hydrofluoric acid (HF) at elevated temperatures converting metal oxides to gaseous metal fluorides and water. Because hydrofluoric acid is an extremely corrosive acid, it is known that the acid may impede servicing by degrading an existing base material by depleting compositional elements and/or causing intergranular attack. Furthermore, hydrofluoric acid is extremely dangerous to handle and may cause skin injury or corneal damage. U.S. Pat. No. 7,303,112 describes a method of repairing a braze joint which includes the use of both an alkali metal molten salt bath and an acid solution.

Thus, there is an ongoing need for an improved turbine component repair procedure incorporating a safe and effective cleaning process.

BRIEF DESCRIPTION OF THE DRAWINGS

The invention is explained in the following description in view of the drawings that show.

DETAILED DESCRIPTION OF THE INVENTION

Figure 2:
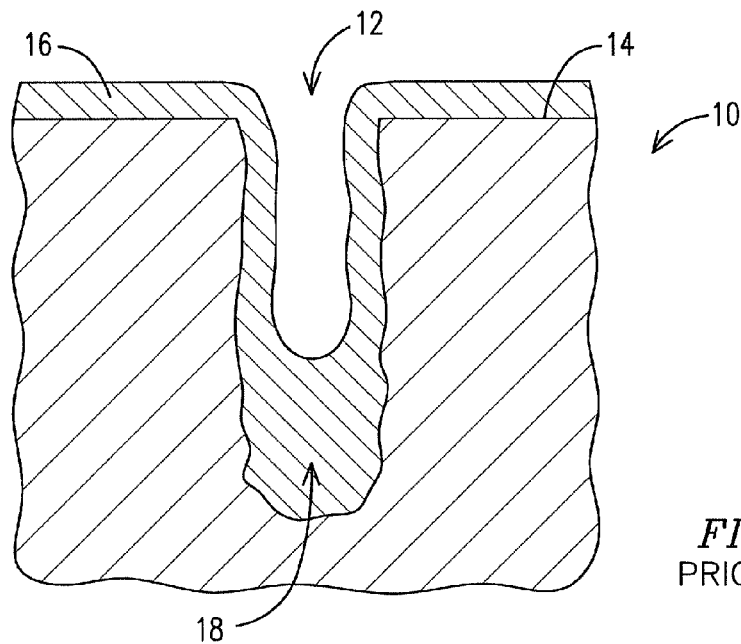
FIG. 2 is a schematic cross-sectional view of a prior art component exhibiting a surface opening crevice filled with a contaminant material.
Figure 3:
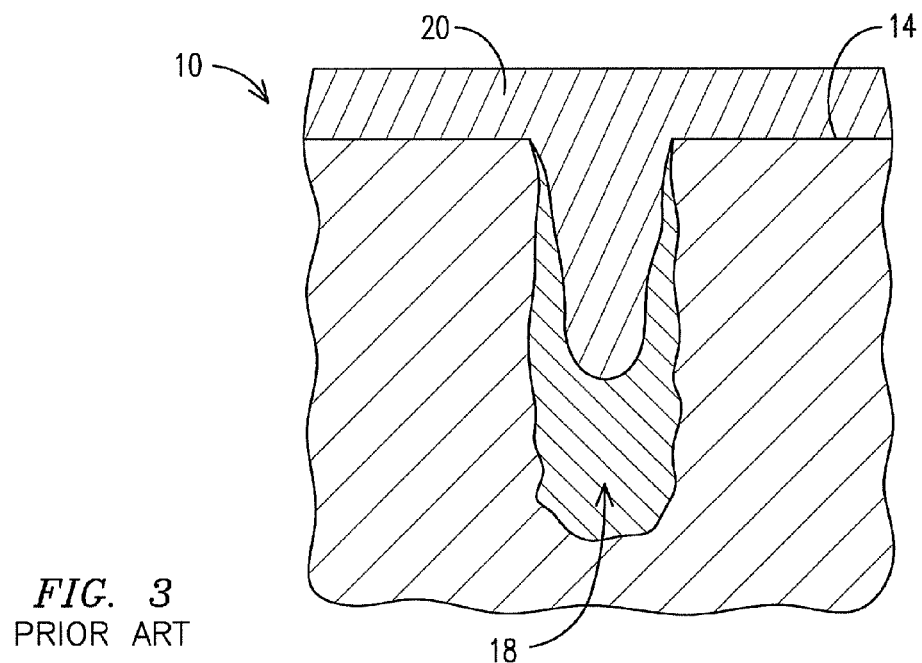
FIG. 3 is the component of FIG. 2 after a prior art cleaning/repair process.

The present inventors have discovered that the prior art acid cleaning procedure does not always completely remove all contaminants/oxides from tiny crevices that may exist in a surface to be repaired, even after a thorough fluoride ion cleaning. FIG. 2 is a schematic cross-sectional illustration of a component 10 exhibiting a surface opening crevice 12 disposed along a surface 14 to be repaired. The surface 14 exhibits a layer of a service induced contaminant 16 which extends into the crevice 12 and fills a tip region 18 of the crevice. Although shown as continuos, the contaminant 16 may not always be continuous across the surface 14 of the base material. FIG. 3 illustrates that same component 10 after a repair procedure wherein the surface 14 has been exposed to a prior art acid cleaning process and then a repair layer of braze material 20 has been applied to the surface. Note that the braze material 20 does not penetrate into the tip region 18 because the contaminant material 16 has not been removed from the tip region 18. This leaves the tip region 18 of the crevice 12 as a stress riser during subsequent machine operation. The existence of the unbrazed subsurface crevice tip region 18 and the resulting stress concentration facilitates the growth of a new crack in the repaired surface in a time period that is less than would have been required for a crack to form in an equivalent completely solid region of the component. Thus, the present inventors have developed a novel repair procedure which incorporates cleaning steps specifically targeting the removal of contaminants/oxides from within surface-opening crevices, thereby solving this previously unappreciated problem of the prior art cleaning/repair procedures.

Figure 4:
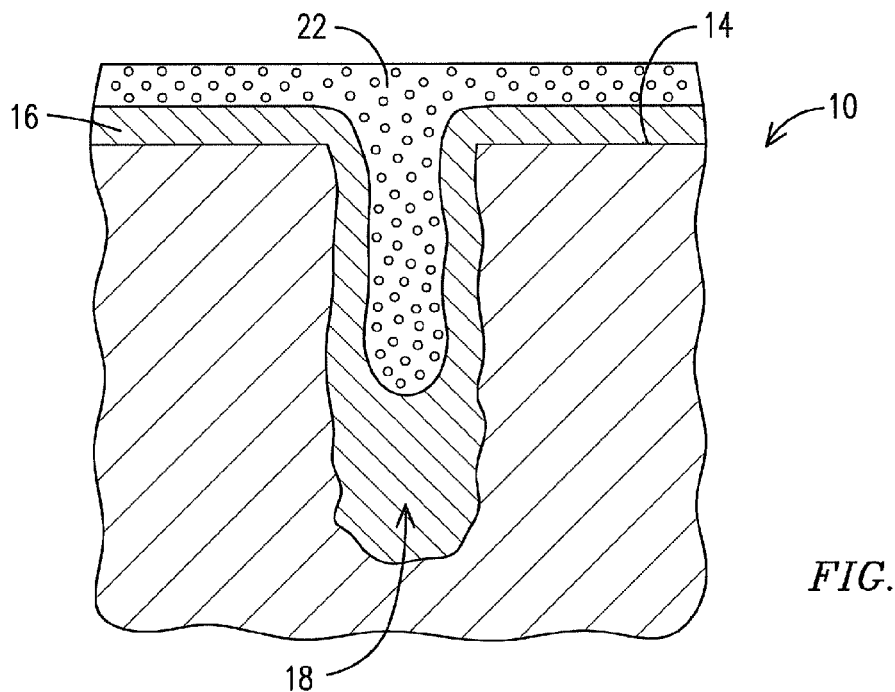
FIG. 4 is the component of FIG. 2 undergoing a cleaning step as part of a repair process in accordance with one embodiment of the present invention.
Figure 5:
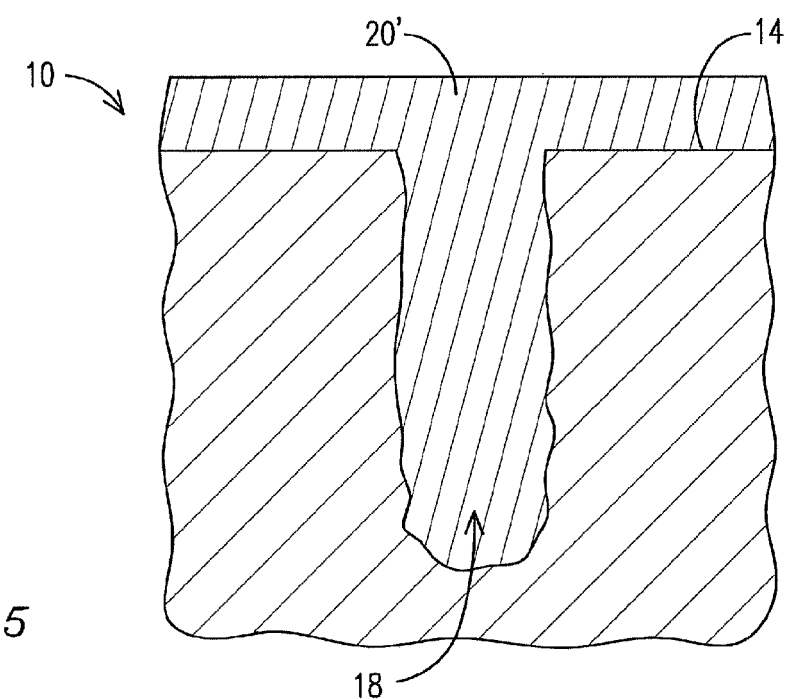
FIG. 5 is the component of FIG. 4 upon completion of the repair process.

FIG. 4 illustrates component 10 undergoing a cleaning step as part of an embodiment of the present invention wherein a colloidal cleaning solution 22 is applied to the surface 14 and layer of contaminant 16, as more fully described below. As a result, the contaminant 16 is removed from the crevice tip region 18, so that when a layer of repair material such as braze material 20' is applied, as illustrated in FIG. 5, the braze material 20' extends into the tip region 18 previously occupied by the contaminant material. This minimizes or eliminates any stress concentration during subsequent operation of the component 10 and allows the component to achieve a repaired life expectancy approaching that of its new condition life expectancy.

Figure 1:
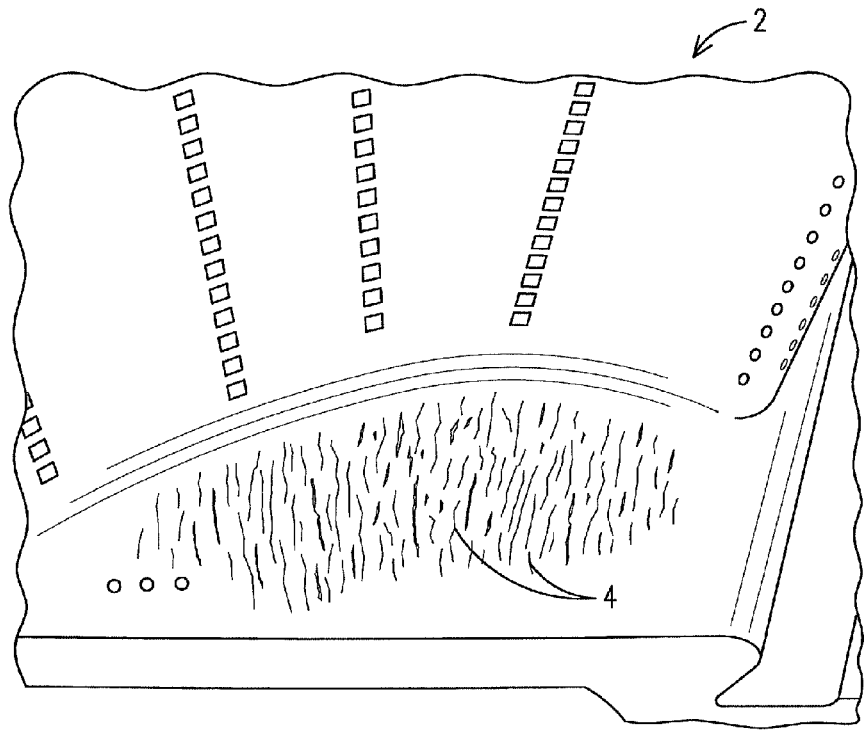
FIG. 1 is an illustration of a gas turbine engine component showing typical service induced surface opening crevices.
Figure 6:
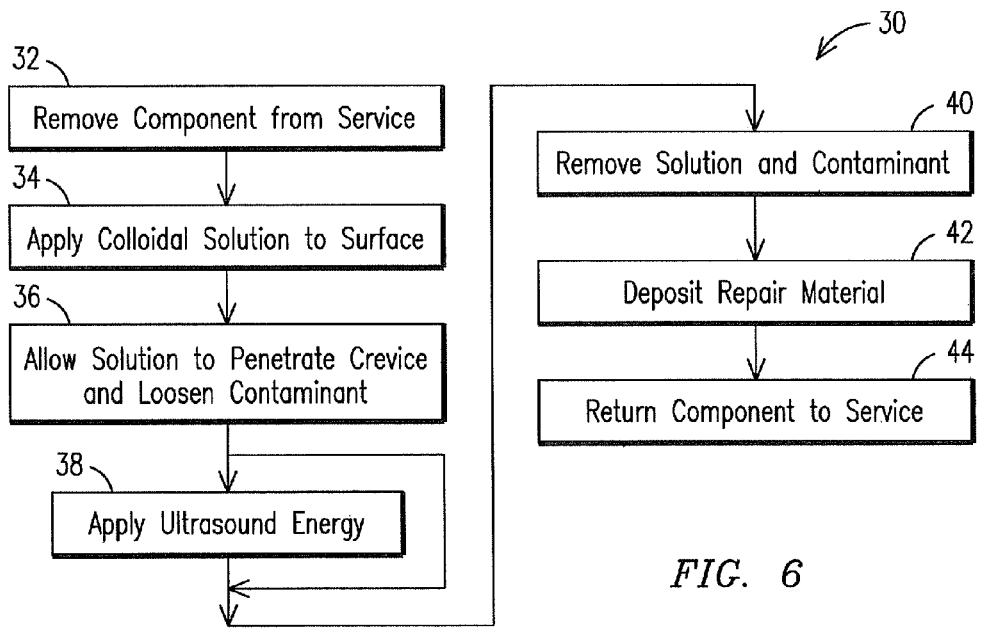
FIG. 6 block diagram showing an embodiment of steps for a repair process as described herein.

FIG. 6 illustrates the steps of a repair procedure 30 incorporating an embodiment of the present invention. A component, such as a gas turbine engine part, is removed from service at step 32. A surface of the component needing repair and exhibiting a surface opening crevice is prepared for repair by applying a colloidal cleaning solution at step 34. At step 36 the solution is allowed to penetrate into the crevice and the chemical-mechanical action of the solution is allowed to loosen the contaminant contained within the crevice. Optionally, mechanical energy such as ultrasonic energy may be applied to the solution within the crevice at step 38 to enhance the cleaning action within the crevice. The loosened contaminant is then removed from the crevice and the surface at step 40 such as by vacuuming. A layer of repair material is applied at step 42, with the repair material now penetrating the crevice to occupy a tip region of the crevice that was previously occupied by the contaminant material. Upon completion of the repair procedure, the component is returned to service at step 44.

The instant invention incorporates a composition and method for cleaning surfaces such as turbine engine components and braze joints. More specifically, solutions are customized to target and remove specific oxide deposits embedded in narrow surface-opening cracks prior to a braze application. Solutions that may be considered include a colloidal mixture or slurry of nanoparticles in a solvent wherein the concentration of nanoparticles is about 0.5 wt % to about 70 wt %. Terms nanoparticle solution or colloid may be used to describe the solid-liquid mixtures, all of which contain distinct nanoparticles dispersed to various degrees in a medium. The slurry may preferably be nontoxic and provide optimal cleaning of tiny crevices existing in braze joints and other portions of gas turbine engine components. Colloid cleaners are known for the cleaning of a variety of types of surfaces, such as walls, floors, machinery, carpet, etc., and they function by breaking surface tension and holding grease, oil and dirt in suspension, thus making them easier to remove from a surface. However, the present inventors have not found them to have been used as part of a repair procedure for an in-service component, nor have they been found to have been used to specifically target the removal of contaminants/oxides from surface-opening crevices. The present inventors have recognized that the random action of the atoms of the colloidal particles will function with sufficient time to allow the cleaning solution to penetrate a surface-exposed crevice and to assist the cleaning process within the crevice by the atomic level movement of the particles against the entrapped contaminants/oxides. Furthermore, the movement of particles against the contaminants/oxides within a crevice may be enhanced by mechanical energy such as ultrasonic energy. The improved repair procedure described herein may further provide colloidal particles which are particularly effective for removing contaminants/oxides which are known to be present within the crevice.

An embodiment of the invention includes a colloidal mixture or slurry of nanoparticles in a polar solvent wherein the pH of the slurry is maintained at about 5 to 9 and at the isoelectric point of the nanoparticles to minimize or prevent flocculation (i.e., agglomeration) due to attractive van der Waals forces. Another embodiment of the invention includes a colloidal mixture or slurry of nanoparticles in a nonpolar solution where a surfactant is added to minimize or prevent agglomeration. The optional use of multiple nanoparticles with different isoelectric points within a single cleaning solution also provides a broader range of optimal cleaning. Furthermore, the properties of the particles may be selected for a particular application, such as using a relatively "soft" ceramic or one with less abrasive properties in a slurry when cleaning a softer substrate. Similarly, for areas needing more aggressive cleaning, relatively harder ceramics such as alumina and silicon carbide can be used. A hardness of a material of the nanoparticles may be selected to be harder than a hardness of the contaminant material to be removed but softer than a hardness of a material of the surface.

Another embodiment of the invention includes applying the exemplary slurries to an article or portion thereof to be cleaned, and the distance between nanoparticles in the slurry is maintained in an optimal physical excitation energy state, thereby penetrating a crevice and abrading contaminants/oxides such as iron oxide and physically removing it from a crevice.

As used herein, a nanoparticle may be any particle defined as a small object that behaves as a whole unit in terms of its transport and properties and according to size, and exhibits a range between 1 and 2500 nanometers, preferably less than 100 nm, for any dimension. There are several methods for creating nanoparticles, including both attrition and pyrolysis, which are available in various shapes including spheres, rods, and films. Suitable nanoparticles may be organic or inorganic, and include ceramics, metal oxides, carbides, nitrides, metalloids and combinations thereof. Metal oxides include crystalline solids that contain a metal cation and an oxide anion not limited to alumina, silica, anatase, zirconia, hematite, lead oxide, and magnesia. Nitrides may include any of a class of chemical compounds in which nitrogen is combined with an element of similar or lower electronegativity, such as metals, in particular boron, vanadium, silicon, titanium, and tantalum which are very refractory, resistant to chemical attack, and hard. Carbides include compounds composed of carbon and a less electronegative element and may include tungsten carbide, silicon carbide, and boron carbide.

Suitable solvents can be either polar or non polar and may include pentane, cyclopentane, hexane, cyclohexane, benzene, toluene, dioxane, diethyl ether, dichloromethane, Tetrahydrofuran (THF), ethyl acetate, acetone, Dimethylformamide (DMF), Acetonitrile (MeCN), Dimethyl sulfoxide (DMSO), formic acid, butanol, isopopanol, propanol, ethanol, methanol, acetic acid, and water. In an embodiment where the nanoparticle solution comprises a polar solvent, the nanoparticles may be maintained at the isoelectric point. Table 1 below illustrates ceramic materials which may be used and the pH of the solution at the associated isoelectric point. The isoelectric point is the value of pH at which the colloidal particle remains stationary in an electrical field with sufficient electrostatic repulsion between particles in order to prevent agglomeration. In this embodiment, the Zeta potential of the nanoparticles may be at least +/−20 mV (i.e. greater than +20 mV or less than −20 mV) to achieve an optimal physical excitation energy state, causing nanoparticles to abrade contaminants/oxides and physically remove them from a surface or crevice.

TABLE 1

| CERAMIC MATERIAL | PH AT ISO ELECTRIC POINT (IEP) |
|---|---|
| Alumina ($Al_2O_3$) | 9.1 [49] |
| Silicia ($SiO_2$) | 2 [50] |
| Anatase ($Tio_2$) | 6 [50] |
| Zirconia ($ZrO_2$) | 6 [50] |
| Hematit | 7.2 [51] |
| Lead Oxide (PbO) | 10 [52] |
| Magnesia (MgO) | 12 [52] |
| Silicon Nitride ($Si_3N_4$) | 8.2 [53] |
| Stannic Oxide ($SnO_2$) | 5.5 [9] |
| Zinc Oxide (ZnO) | 9 [52] |
| Silicon Carbide (SiC) | 3.5 |
| Barium Titanate ($BaTiO_3$) | 5.5 |

The pH of the solution may be adjusted before or after adding nanoparticles to form the dispersion. Suitable pH adjusters include, for example, bases such as potassium hydroxide, ammonium hydroxide, sodium carbonate, and mixtures thereof, as well as acids such as mineral acids (e.g., nitric acid and sulfuric acid) and organic acids (e.g., acetic acid, citric acid, malonic acid, succinic acid, tartaric acid, and oxalic acid). An example of solutions that may be customized to target narrow cracks for gas turbine engine applications may include the following three formulas, when in polar solvent:

nano silica+H2O+PAA/PMMA(Particle D(50)=20, 50, and 80 nm, SSA=130 to 35 m2/g, 5 to 25 v/o Solids,    1)

where PAA in this formula and throughout specification means poly acrylic acid, where PMMA in this formula and throughout the specification means poly(methyl methacrylate), where for Particle D("X") in this formula and throughout the specification, the value "X" means the size in microns that splits the distribution with half above and half below this diameter, where SSA in this formula and throughout the specification means specific surface area, where v/o in this formula and throughout the specification means volatile organic, $$\text{nano alumina}+H_2O+PAA/PMMA(\text{Particle } D(50)=20, 50, \text{ and } 80 \text{ nm}, SSA=130 \text{ to } 35 \text{ m}^2/\text{g}, 5 \text{ to } 25 \text{ v/o Solids}) \qquad 2)$$

$$\text{nano zirconia}+H_2O+PAA/PMMA(\text{Particle } D(50)=20, 50, \text{ and } 80 \text{ nm}, SSA=130 \text{ to } 35 \text{ m}^2/\text{g}, 5 \text{ to } 25 \text{ v/o Solids}) \qquad 3)$$

It is an embodiment of the invention to have a variety of nanoparticles in different concentrations contained in the slurry with a pH threshold of about 5 to 9. Generally, mixed oxides will exhibit isoelectric point values intermediate to those of corresponding pure oxides. In the instance where a concentration of various nanoparticles exhibits ideal cleaning properties, but the pH is outside a desirable threshold, the pH may be adjusted and surfactants may be added to maintain the Zeta potential at least at +/−20 mV.

In an embodiment where the nanoparticle solution comprises a non polar solvent, the pH of the slurry is not critical to preventing agglomeration. In this example, however, sufficient steric repulsion can be created between particles to prevent agglomeration, which may be accomplished by the addition of the appropriate amount and type of surfactant. Surfactants include dispersants (a dispersing agent or plasticizer) and are additives that increase the plasticity or fluidity of the colloid to improve the separation of nanoparticles and prevent agglomeration and are not limited to non-surface active polymers or surface-active substances from a concentration of about 0.1% to about 30% by volume. An example of solutions that may be customized to target narrow cracks may include the following two formulas, when in non polar solvent:

$$\text{nano silicon carbide}+\text{Decalin/Hexane}+PVC(\text{Particle } D(50)=20, 50, \text{ and } 80 \text{ nm}, SSA=130 \text{ to } 35 \text{ m}^2/\text{g}, 5 \text{ to } 25 \text{ v/o Solids}), \qquad 4)$$

where PVC in this formula and throughout the specification means polyvinyl chloride $$\text{nano silicon nitride}+\text{Decalin/Hexane}+PVC(\text{Particle } D(50)=20, 50, \text{ and } 80 \text{ nm}, SSA=130 \text{ to } 35 \text{ m}^2/\text{g}, 5 \text{ to } 25 \text{ v/o Solids}) \qquad 5)$$

Surfactants which may be considered can be ionic or nonionic and include perfluorooctanoate, perfluorooctanesulfonate, sodium dodecyl sulfate, ammonium lauryl sulfate, other alkyl sulfate salts, sodium laureth sulfate, alkyl benzene sulfonate, soaps, fatty acid, cetyl trimethylammonium bromide, other alkyltrimethylammonium salts, cetylpyridinium chloride, polyethoxylated tallow amine, benzalkonium chloride, benzethonium chloride, dodecyl betaine, cocamidopropyl betaine, coco ampho glycinate, alkyl poly(ethylene oxide), alkylphenol poly(ethylene oxide), copolymers of poly (ethylene oxide) and poly(propylene oxide) (commercially called poloxamers or poloxamines), alkyl polyglucosides, octyl glucoside, decyl maltoside, fatty alcohols, cetyl alcohol, oleyl alcohol, cocamide monoethanolamine (MEA), cocamide diethanolamine (DEA), and polysorbates.

It is one embodiment of the present invention to apply a slurry to a braze which forms a portion of a surface of a gas turbine engine exposed to a working fluid during a post-operation service activity. The slurry may be a mixture of different nanoparticles in suspension. For example, combining a nitride and carbide at different concentrations, and maintaining the mixture at its isoelectric point in a solution of water, for example. The composition may be applied to the braze by known methods in the art, not limited to spray, brush, or bath applications.

It is a further embodiment of the invention to provide additional cleaning to a region in order to complement the action of the colloid with an appropriate mechanical action, such as by applying ultrasonic energy. A method of cleaning may include the steps of: applying a colloidal solution to a surface; agitating the colloidal solution to mechanically engage the nanoparticles against a contaminant material disposed within the crevices to loosen the contaminant material from the crevices; and removing the colloidal solution and loosened contaminant material from the surface. A vacuum may be used to remove loosened contaminants/oxides from the surface and from within crevices. Upon cleaning of a surface and its surface-exposed crevices using a colloidal solution as described above, a subsequent material overlay (braze, weld, transient liquid phase bonding, etc.) will bond optimally with the cleaned surface and will better fill the cleaned crevice regions than can be achieved with prior art cleaning procedures. The improved sealing of crevice tips achieved with the present invention will reduce or prevent premature cracking at the crevice site that has been experienced with prior art cleaning/repair procedures.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of repairing a turbine engine component, the method comprising:
    applying a colloidal solution to a surface of a turbine engine component having a surface opening crevice, the colloidal solution comprising nanoparticles suspended in a solvent;
    allowing the colloidal solution to penetrate the crevice and loosen a contaminant material disposed within a tip region of the crevice;
    removing the colloidal solution and loosened contaminant material from the crevice and surface;
    depositing a repair material onto the surface and into the crevice to penetrate the tip region of the crevice previously occupied by the contaminant material; and,
    wherein the solvent comprises a non-polar solvent, and wherein the colloidal solution is characterized as:
    (either nano silicon nitride or nano silicon carbide)+(either Decalin or Hexane)+polyvinyl chloride (particle D(50)), wherein particles of the colloidal solution are characterized by: particle D(50)=20 nm, 50 nm and/or 80 nma specific surface area=130 to 35 m$^2$/g, and 5 to 25 volatile organic solids.

2. The method of claim 1, further comprising agitating the colloidal solution against the contaminant material within the crevice with ultrasonic energy.

3. The method of claim 1, wherein a hardness of a material of the nanoparticles is selected to be harder than a hardness of the contaminant material but softer than a hardness of a material of the surface.

4. The method of claim 1, further comprising selecting the nanoparticles from the group consisting of ceramics, carbides, nitrides, and metalloids and combinations thereof, wherein said composition has a pH of about 5 to 9.

5. The method of claim 1, further comprising selecting the nanoparticles to comprise two different materials.

6. The method of claim 1, further comprising selecting the solution to exhibit a Zeta potential of at least +/−20 mV.

7. A method of repairing a turbine engine component, the method comprising:
- applying a colloidal solution to a surface of a turbine engine component having a surface opening crevice, the colloidal solution comprising nanoparticles suspended in a solvent;
- allowing the colloidal solution to penetrate the crevice and loosen a contaminant material disposed within a tip region of the crevice;
- removing the colloidal solution and loosened contaminant material from the crevice and surface;
- depositing a repair material onto the surface and into the crevice to penetrate the tip region of the crevice previously occupied by the contaminant material; and,
- wherein the solvent comprises a non-polar solvent, and wherein the colloidal solution is characterized as:
- nano silicon carbide+(either Decalin or Hexane)+polyvinyl chloride, wherein particles of the colloidal solution are characterized by: particle D(50)=20 nm, a specific surface area=130 to 35 m$^2$/g, and 5 to 25 volatile organicsolids.

8. A method of repairing a turbine engine component, the method comprising:
- applying a colloidal solution to a surface of a turbine engine component having a surface opening crevice, the colloidal solution comprising nanoparticles suspended in a solvent;
- allowing the colloidal solution to penetrate the crevice and loosen a contaminant material disposed within a tip region of the crevice;
- removing the colloidal solution and loosened contaminant material from the crevice and surface;
- depositing a repair material onto the surface and into the crevice to penetrate the tip region of the crevice previously occupied by the contaminant material; and,
- wherein the solvent comprises a non-polar solvent, and wherein the colloidal solution is characterized as:
- nano silicon carbide+(either Decalin or Hexane)+polyvinyl chloride, wherein particles of the colloidal solution are characterized by: particle D(50)=50 nm, a specific surface area=130 to 35 m$^2$/g, and 5 to 25 volatile organicsolids.

9. A method of repairing a turbine engine component, the method comprising:
- applying a colloidal solution to a surface of a turbine engine component having a surface opening crevice, the colloidal solution comprising nanoparticles suspended in a solvent;
- allowing the colloidal solution to penetrate the crevice and loosen a contaminant material disposed within a tip region of the crevice;
- removing the colloidal solution and loosened contaminant material from the crevice and surface;
- depositing a repair material onto the surface and into the crevice to penetrate the tip region of the crevice previously occupied by the contaminant material; and,
- wherein the solvent comprises a non-polar solvent, and wherein the colloidal solution is characterized as:
- nano silicon carbide+(either Decalin or Hexane)+polyvinyl chloride, wherein particles of the colloidal solution are characterized by: particle D(50)=80 nm, a specific surface area=130 to 35 m$^2$/g, and 5 to 25 volatile organicsolids.

* * * * *